Feb. 10, 1959    D. E. TRUMBO    2,873,388
PULSE COUNTER
Filed May 10, 1957

INVENTOR.
DONALD E. TRUMBO
BY
*Roland A. Anderson*
ATTORNEY.

United States Patent Office 2,873,388
Patented Feb. 10, 1959

2,873,388
PULSE COUNTER

Donald E. Trumbo, Pleasant Hill, Calif., assignor to the United States of America as represented by the United States Atomic Energy Commission Application May 10, 1957, Serial No. 658,473

5 Claims. (Cl. 307—88.5)

The present invention relates to counting circuits and more particularly to a circuit for counting pulses in groups.

The well-known scale of two circuit has been depended upon for a majority of counting work; however, such circuits are complex and expensive where the counting scale is of a higher order than two. As an example of the foregoing, in order to obtain an overall scale of ten it is necessary to interconnect four scale of two circuits which requires at least four double triode type tubes and, in addition, a number of diode type tubes. The present invention provides a scale of ten circuit with a single transistor which is triggered at the tenth count pulse by the accumulated charge on a storage capacitor and, thus, has many advantages over the known counting circuits.

It is therefore an object of the invention to provide a new and improved counting circuit.

Another object of the invention is to provide a simple, accurate, and inexpensive counting circuit.

Still another object of the invention is to provide a counting circuit having low power consumption.

A further object of the invention is to provide a counting circuit having a readily adjustable count scale.

A still further object of the invention is to provide a counting circuit having a high degree of stability in operation and in the output.

Other objects and advantages will be apparent in the following description and claims considered together with the accompanying drawing, in which:

Figure 1:
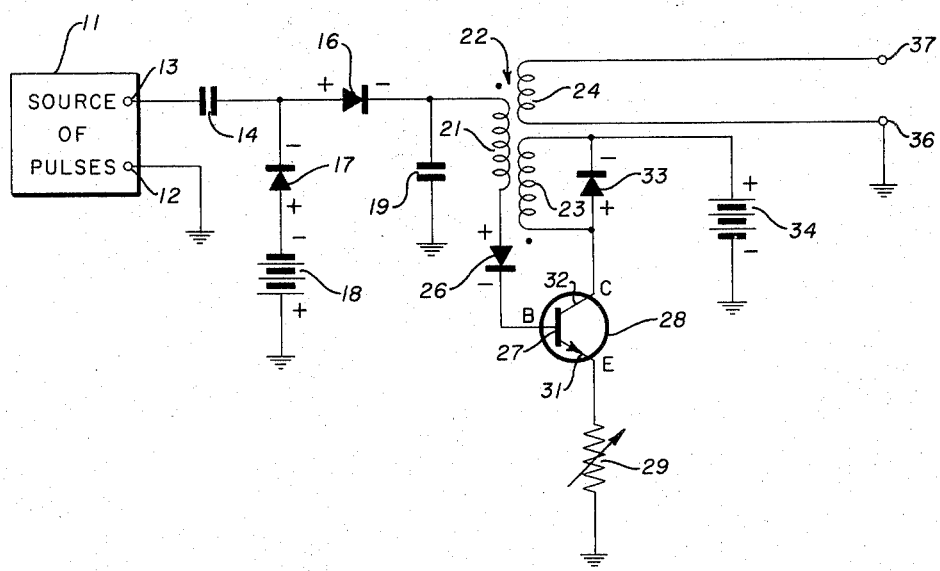
Figure 1 is a schematic circuit diagram of the counting circuit.

Referring to the drawing in detail, Fig. 1 in particular, there is provided a source 11 of random pulses. Such source 11 is any one of many types, as for example a photomultiplier tube circuit or other tube for detecting radiation, and includes a limiting circuit for providing positive-going pulses of uniform magnitude. An output terminal 12 of the source 11 is directly connected to ground and another output terminal 13 is connected to one plate of a coupling capacitor 14, the other plate of which is connected to the positive terminal of a crystal type diode 16. The junction between the coupling capacitor 14 and the diode 16 is connected to the negative terminal of another crystal type diode 17 with the positive terminal of such diode connected to the negative terminal of a direct current source 18, as for example a number of series-connected batteries. The positive terminal of the direct current source 18 is directly connected to ground and it is readily apparent that conduction through the diode 17 is possible only when the negative terminal is more negative than the negative value of voltage of the direct current source.

To accumulate and store pulses of voltage passed by the first-referenced diode 16, a storage capacitor 19 is connected between the negative terminal of the diode and ground. The junction of the diode 16 and the storage capacitor 19 is connected to one terminal of the secondary winding 21 of a transformer 22, which also has a primary winding 23 and a tertiary output winding 24. Another crystal type diode 26 is provided with the positive terminal connected to the other terminal of the secondary winding 21 and the negative terminal connected to the base electrode 27 of a transistor 28 which may be of the n-p-n type as illustrated in the drawing. It is to be appreciated that in general, transistor circuits may undergo sustained or erratic oscillations where rapid current reversals occur at one of the transistor electrodes. In this connection, the charge stored on capacitor 19 rapidly reverses polarity in a manner which is subsequently described. In the absence of diode 26, such reversals of charge polarity would be directly impressed at the base electrode 27 of transistor 28 and tend to effect forced erratic circuit oscillations detrimental to the operation of the present invention. Thus, the diode 26 isolates the transistor 28 from the charge stored on the capacitor 19 until such time as a desired condition for conduction through the diode occurs, as will be set forth more fully heerinafter.

A variable resistor 29 is connected between the emitter electrode 31 of the transistor 28 and ground to provide adjustment of the current flow through the transistor and thereby the amplitude of the output pulse. The collector electrode 32 of the transistor 28 is connected to one terminal of the primary winding 23 of the transformer 22 and to the positive terminal of still another crystal type diode 33. The other terminal of the primary winding 23 and the negative terminal of the diode 33 are connected together and further connected to the positive terminal of another direct current source 34, such as a plurality of series-connected batteries as shown in the drawing, with the negative terminal of the source connected to ground. The two terminals of the tertiary output winding 24 of the transformer 22 are respectively connected to a grounded output terminal 36 and an output terminal 37.

With the circuit connected in accordance with the foregoing description, the first positive pulse at the output of the pulse source 11 results in the accumulation of a positive charge at the storage capacitor 19 and the impression of a positive voltage at the base electrode 27 of the transistor 28. Such positive voltage at the base electrode 27 causes a surge of current through the transistor 28 and the primary winding 23 of the transformer 22. A potential is then induced in the secondary winding 21 of the transformer 22 by the current surge and the induced potential reduces the positive charge of the storage capacitor 19 to a negative value and at the same time increases the positive potential of the base electrode 27 of the transistor 28. Thus the operation of the transistor 28 is regenerative until such time as maximum current is flowing as limited by the value of resistance established by the variable resistor 29 and the value of the operating potential impressed by the direct current source 34. At the time of maximum current flow, the magnetic field linking the primary and secondary windings 23, 21 of the transformer 22 collapses and the induced potential of the secondary winding rapidly falls to zero. Reverse pulses and subsequent oscillations are prevented at the collector electrode 32 of the transistor 28 by the diode 33, which is connected in parallel with the primary winding 23 of the transformer 22. The negative charge of the storage capacitor 19 then remains at a value established by the direct current source 18 because any tendency of the capacitor to accumulate a more negative charge than that of the source results in conduction through the diodes 16 and 17 to discharge the excess charge. Also, it is readily apparent that the reduction of the induced potential of the secondary winding 21 reduces the potential of the base electrode 27 of the transistor 28 to zero at which value the potential is held because of the isolation provided by the diode 26 backed with the negative charge of the capacitor 19. Diode 26 thus prevents a reversal in the base current of transistor 28 and therefore the possible establishment of attendant oscillations in such transistor which would result in the untimely conduction thereof. The transistor is only rendered conducting in response to the application of a positive potential to the positive terminal of diode 26.

Subsequently occurring random positive pulses at the output of the pulse source 11 are then passed to the storage capacitor 19 by the coupling capacitor 14 and diode 16 to decrease the negative charge of the storage capacitor. More particularly, each positive pulse applied to the positive terminal of diode 16 causes same to conduct for an increment of time substantially equal to the pulse duration. During each conduction period of diode 16 a portion of the negative charge stored by condenser 19 is rapidly discharged through a current path including diode 16, coupling capacitor 14, and source 11 to ground. The amount of the charge removed is proportional to the magnitude of the applied positive pulse and therefore the voltage across capacitor 19 is correspondingly abruptly increased by substantially the peak potential of the pulse. It will be appreciated that any slight charge which may accumulate on coupling capacitor 14 by virtue of the discharge of storage capacitor 19 therethrough is discharged to ground through source 11 during the intervals between pulses therefrom. Successive positive pulses applied to diode 16 thus incrementally discharge capacitor 19 in a stepped fashion and after a sufficient number of pulses are applied all of the negative charge is removed from the capacitor and a positive charge is accumulated thereon. As long as the charge of the storage capacitor 19 remains negative the diode 26 remains in a nonconductive state and so prevents conduction of the transistor 28. When sufficient positive pulses have been passed to the storage capacitor 19 to overcome the negative charge and place a positive charge thereon, the diode 26 conducts to impress a positive potential on the base electrode 27 and render the transistor 28 conducting. The circuit then operates in the same manner as set forth in the preceding paragraph with respect to the first pulse from the pulse source 11 at the base electrode 27 of the transistor 28. Each time a surge of current flows through the primary winding 23 of the transformer 21 a pulse of voltage is induced in the tertiary 24 and such pulse is available at the output terminal to operate an electromechanical counter or other subsequent device (not shown).

Figure 2:
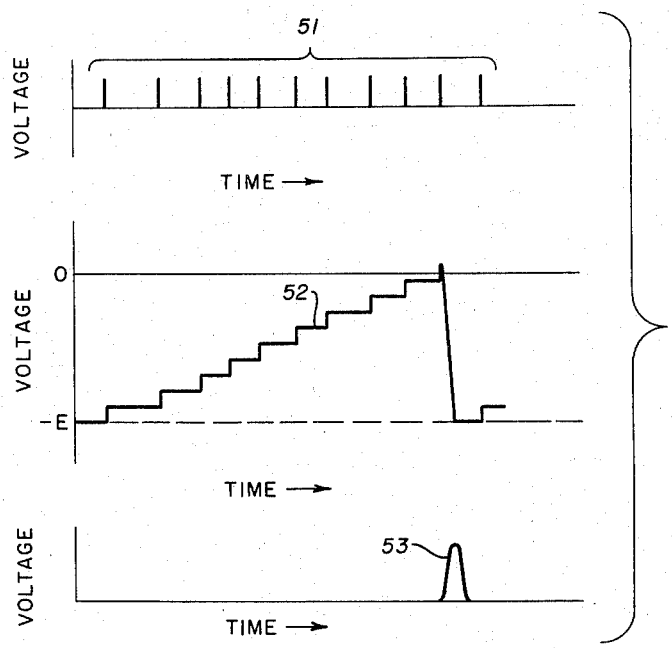
Figure 2 is a series of time correlated waveforms occurring during operation of the circuit of Fig. 1.

As an example, the present invention is useful as a counter of ten consecutive, random, and uniform pulses. In such use the direct current source 18 has a voltage value substantially equal to nine and a half times the voltage value of one of the pulses at the output of the pulse source 11. Thus, the negative charge of the storage capacitor 19 is limited to a value equal to negative voltage value of the direct current source 18. After the negative charge is established upon the storage capacitor 19, the circuit is in condition for counting a train of random pulses 51 (see Fig. 2). The first of such train of pulses decreases the negative charge of the storage capacitor 19 and subsequent pulses result in further incremental decreases to provide a stepped waveform 52 (see Fig. 2) increasing from a maximum negative value toward a positive value. The tenth pulse of the train raises the charge of the storage capacitor 19 to a positive value which effects conduction of diode 26 and is transferred to the transistor 28 through the diode 26 resulting in conduction through the transistor. The surge of current through the transistor 28 flows through the primary winding 23 of the transformer 22 and induces voltages in both the secondary and tertiary windings 21, 24. When the transistor 28 is again rendered nonconducting, in the previously described manner, the voltage of the tertiary output winding 24 decreases to zero so that a voltage pulse 53 (see Fig. 2) occurs at the output terminals 36, 37. The circuit is then ready for the next train of ten pulses. From the foregoing example it is readily apparent that pulses can be counted in groups other than ten by merely varying the limiting value, E, of voltage of the direct current source 18 in accordance with the expression $E = e(n - .5)$ where $e$ is the peak value of the pulses to be counted and $n$ is the number of such pulses.

The present invention can readily be adapted for use with nuclear radiation detecting devices to provide small, light weight portable counters. The small size and low power requirements of the transistor are of particular value in such instance.

While the salient features of the present invention have been described in detail with respect to one embodiment, it will be readily apparent that numerous modifications may be made within the spirit and scope of the invention and it is not desired to limit the invention to the exact details shown except insofar as they may be defined in the following claims.

What is claimed is:

1. In a counter circuit, the combination comprising a source of random pulses of uniform magnitude, a storage capacitor having one side connected to ground, a unidirectional device connected between said source and a second side of said capacitor to pass pulses having a positive value, a transformer having at least a primary and a secondary with one terminal of the latter connected to the second side of said capacitor, a transistor having a base electrode, an emitter electrode, and a collector electrode, means connected between a second terminal of said secondary and said base electrode to isolate said base electrode from a negative charge on said capacitor, a variable resistor having one side connected to said emitter electrode, said collector electrode connected to one terminal of said primary, a source of operating potential connected between a second terminal of said primary and a second side of said resistor, and means coupled to said capacitor to limit the maximum value of a negative charge accumulated during conduction of said transistor.

2. In a counter circuit, the combination comprising a source of random pulses of uniform magnitude, a storage capacitor having one side connected to ground, a diode with a positive terminal coupled to said source and a negative terminal connected to a second side of said capacitor, a transformer having a primary, secondary, and tertiary winding with one terminal of said secondary connected to the second side of said capacitor, a transistor having a base electrode, an emitter electrode, and a collector electrode, means connected between a second terminal of said secondary and said base electrode to isolate said base electrode from a negative charge on said capacitor, a variable resistor having one side connected to said emitter electrode, said collector electrode connected to one terminal of said primary, a source of operating potential connected between a second terminal of said primary and a second side of said resistor, means connected in parallel with said primary to dampen oscillations at said collector electrode, and means coupled to said capacitor to limit the maximum value of negative charge accumulated during conduction of said transistor whereby an output pulse is induced in said tertiary each time said transistor conducts.

3. In a counter circuit, the combination comprising a source of random pulses of uniform magnitude, a storage capacitor, a first diode with a positive terminal coupled to said source and a negative terminal connected to a first plate of said capacitor, a second diode with a negative terminal connected to the positive terminal of said first diode, a source of limiting voltage with a negative terminal connected to a positive terminal of said second diode and a positive terminal connected to a second plate of said capacitor, a transformer having a primary, secondary, and tertiary winding with one terminal of said secondary connected to the first plate of said capacitor, a transistor having a base electrode, an emitter electrode, and a collector electrode, unidirectional means connected between a second terminal of said secondary and said base electrode to isolate said base electrode from a negative charge on said capacitor, a variable resistor connected between said emitter electrode and the second plate of said capacitor, said collector electrode connected to one terminal of said primary, a source of operating potential connected between a second terminal of said primary and said resistor, and means connected in parallel with said primary to dampen oscillations at said collector electrode, whereby an output pulse is induced in said tertiary each time said transistor conducts.

4. In a counter circuit, the combination comprising a source of random pulses of uniform magnitude, a storage capacitor, a first diode with a positive terminal coupled to said source and a negative terminal connected to a first plate of said capacitor, a second diode with a negative terminal connected to the positive terminal of said first diode, a source of limiting voltage with a negative terminal connected to a positive terminal of said second diode and a positive terminal connected to a second plate of said capacitor, a transformer having a primary, secondary, and tertiary winding with one terminal of said secondary connected to the first plate of said capacitor, a transistor having a base electrode, an emitter electrode, and a collector electrode, a third diode with a positive terminal connected to a second terminal of said secondary and a negative terminal connected to said base electrode, a variable resistor connected between said emitter electrode and the second plate of said capacitor, said collector electrode connected to one terminal of said primary, a source of operating potential connected between a second terminal of said primary and said resistor, and means connected in parallel with said primary to dampen oscillations at said collector electrode, whereby an output pulse is induced in said tertiary each time said transistor conducts.

5. In a circuit for counting pulses in groups of $n$ pulses, the combination comprising a source of random pulses of uniform magnitude $(e)$, a storage capacitor, a first diode with a positive terminal coupled to said source and a negative terminal connected to a first plate of said capacitor, a second diode with a negative terminal connected to the posive terminal of said first diode, a source of limiting voltage substantially equal to $e(n-.5)$ with a negative terminal connected to a positive terminal of said second diode and a positive terminal connected to a second plate of said capacitor, a transformer having a primary, secondary, and tertiary winding with one terminal of said secondary connected to the first plate of said capacitor, a transistor having a base electrode, an emitter electrode, and a collector electrode, a third diode with a positive terminal connected to a second treminal of said secondary and a negative terminal connected to said base electrode, a variable resistor connected between said emitter electrode and the second plate of said capacitor, said collector electrode connected to one terminal of said primary, a source of operating potential connected between a second terminal of said primary and said resistor, and a fourth diode with a positive terminal connected to said collector electrode and a negative terminal connected to the second terminal of said primary, whereby an output pulse is induced in said tertiary for each group of $n$ pulses.

References Cited in the file of this patent

UNITED STATES PATENTS

| | | |
|---|---|---|
| 2,487,191 | Smith | Nov. 8, 1949 |
| 2,529,547 | Fisher | Nov. 14, 1950 |
| 2,562,228 | Atwood | July 31, 1951 |
| 2,584,990 | Dimond | Feb. 12, 1952 |
| 2,648,767 | Houghton | Aug. 11, 1953 |